Jan. 1, 1963 E. GOTTESMANN 3,070,888
OPTICAL READER AND INDICATOR
Filed May 15, 1958 2 Sheets-Sheet 1

INVENTOR.
Emanuel Gottesmann
BY
Munn, Liddy, Daniels & March
ATTORNEYS

Jan. 1, 1963 E. GOTTESMANN 3,070,888
OPTICAL READER AND INDICATOR
Filed May 15, 1958 2 Sheets-Sheet 2
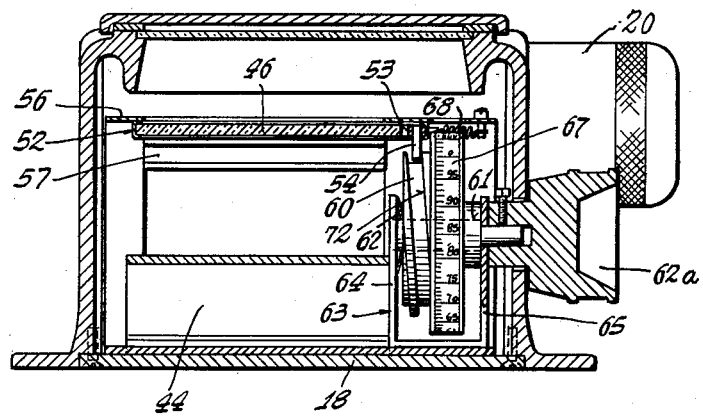
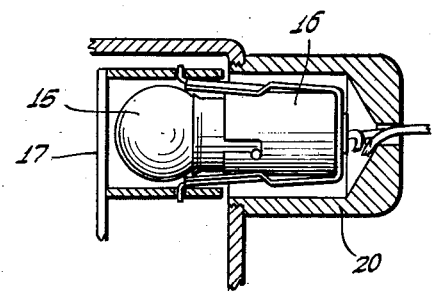
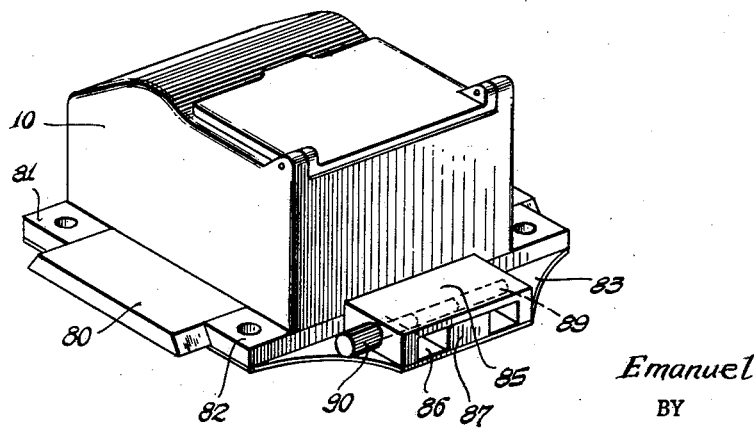
INVENTOR.
Emanuel Gottesmann
BY
Munn, Liddy, Daniels & March
ATTORNEYS

United States Patent Office 3,070,888
Patented Jan. 1, 1963

3,070,888
OPTICAL READER AND INDICATOR
Emanuel Gottesmann, New York, N.Y., assignor to Veriscope Corporation, New York, N.Y., a corporation of New York
Filed May 15, 1958, Ser. No. 735,450
2 Claims. (Cl. 33—125)

This invention relates to optical, micrometer-type reader and indicator devices, and more particularly to devices of this type which are employed in connection with machine tools and the like, to indicate precise adjustments or positionings of the work pieces which are being machined in such tools.

An object of the present invention is to provide a novel and improved optical, micrometer-type reader and indicator device wherein a relatively great magnification and projection of an image is obtained by a comparatively small optical system adapted to be contained in a small casing.

A feature of the present invention resides in the provision, in an optical, micrometer-type reader and indicator device, of a novel and improved optical system wherein the light rays from the illuminated surface which provides the image, pass mostly through air and through but a small amount of glass, in contradistinction to prior optical systems employing prisms, where the light rays pass through substantial thicknesses of glass. In consequence of such improved organization a maximum degree of magnification is obtained with only a relatively short path of travel of the light rays.

A further object of the invention is to provide a novel so-called catch-box or mirror-screen unit having simplified and effective rotary cam means for shifting the screen element edgewise to provide for interpolation between the lines of the projected precision scale image.

Another feature of the invention resides in the provision of a novel and simplified screen shifting means comprising a rotary cam and follower pin engaged with said cam and characterized by a spring-bias or spring-loading means associated with the screen, in a manner to cause the follower pin to continually press against the rotary cam so as to eliminate backlash or lost motion during reverse adjustment or actuation of the shifting means.

A further feature of the invention resides in the provision of a novel rotary cam type shifting mechanism for the screen element, in conjunction with projected image lines on said element, the lead or pitch of the cam being greater than the spacing of the image lines to enable full displacement or shifting of the screen to be had through a distance equal to such spacing, by turning the cam through less than one revolution.

Another object of the invention is to provide an improved combination rotary cam and rotary scale unit wherein the cam and scale are normally movable in unison yet are constituted of two separate members so arranged as to permit relative movement therebetween for adjustment purposes. Such adjustment is of particular advantage in setting the scale with relation to fixed stops provided for the rotary cam.

Yet another feature of the invention resides in the provision of a novel assemblage of flat screen, channel-section frame extending around the edge portions of the screen, and carrier bar disposed within the frame and rigidly positioned thereby, said carrier bar rigidly mounting the cam follower member by which the shifting movement of the screen is effected.

A further feature of the invention resides in the provision of a spring-loaded rotary cam shaft, in conjunction with the spring-loaded screen assemblage whereby all unidirectional slack in the shifting mechanism is automatically taken up during either forward or reverse shifting of the screen.

Another object of the invention is to provide an improved optical, micrometer-type reader and indicator device for use with a machine tool, wherein the entire device is shiftable within limits with respect to its mounting plate, in a manner to avoid the necessity for exact positioning of a work piece on the machine table.

Another and advantageous feature of the invention resides in the provision of a novel combination of movably mounted and spring-loaded precision machine scale in conjunction with a micrometer reader and indicator device, which combination is characterized by a uniform and substantially invariable spacing between the scale and the optical system of said device while the latter traverses the scale in providing readings and/or indications.

Other features and advantages will hereinafter appear.

In the drawings accompanying this specification, similar characters of reference are used to designate like components throughout the several views, in which:

FIG. 3 is a vertical sectional view, taken on the line 3—3 of FIG. 1.

FIG. 4 is a fragmentary vertical sectional view, taken the line 4—4 of FIG. 1.

FIG. 5 is a perspective view of a reader and indicator device illustrating another form of the invention.

Figure 1:
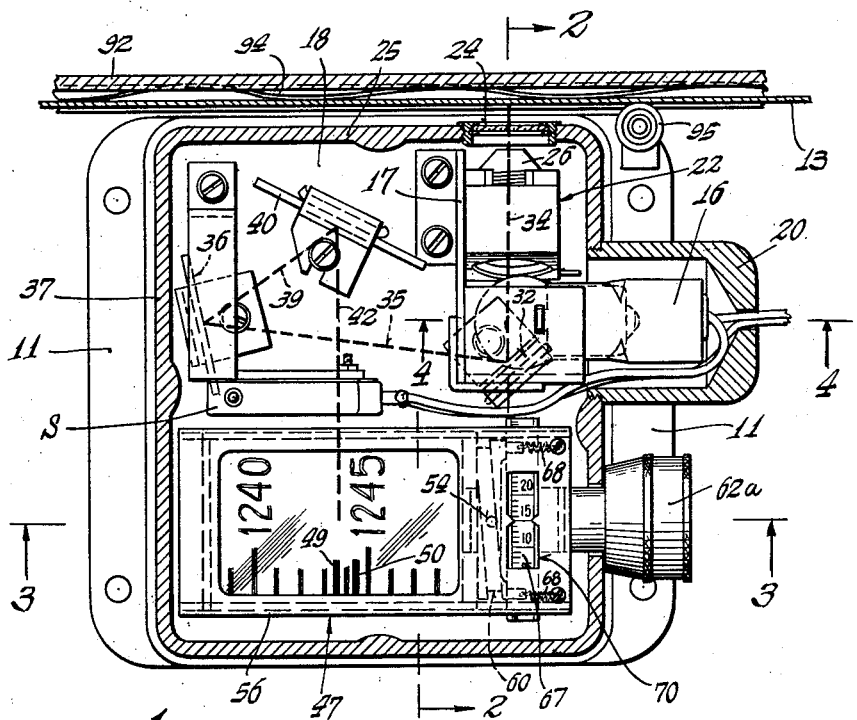
FIGURE 1 is a horizontal sectional view through an optical, micrometer-type reader and indicator device embodying the present invention.
Figure 2:
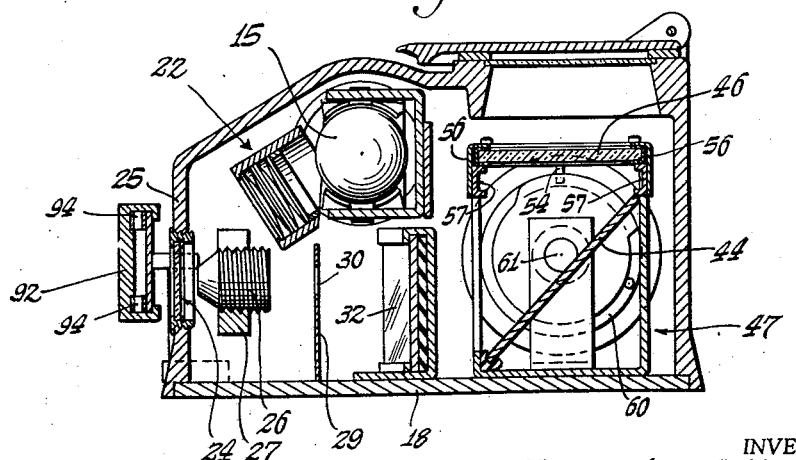
FIG. 2 is a vertical sectional view, taken on the line 2—2 of FIG. 1.

Referring first to FIGS. 1 and 2, the optical reader and indicator illustrated therein comprises a casing indicated generally by the numeral 10, said casing being roughly of rectangular configuration as seen from the top thereof and having a pair of oppositely disposed mounting flanges 11 by which it may be secured to a supporting member of a machine tool or the like (not shown).

Extending along one side of the casing 10, that commonly understood as being the front side of the casing, there is located an elongate scale member 13 which is normally carried by the movable carriage of the machine tool (not shown). The scale member 13 may be of any usual type, provided with numbered graduations and subdivisions between the same as is readily understood.

By the present invention, I provide within the casing 10 a novel and improved, extremely small and compact optical system by which a portion of the scale 13 is magnified and projected on a screen element, the latter being associated with micrometer adjustment and scale means by which minute movements of the scale 13 will be accurately indicated and may be readily measured for purposes found advantageous in performing operations on a work piece mounted on the carriage which carries the scale member 13.

Within the casing 10 there is provided a light source 15 in the form of a small, incandescent electric bulb, said bulb being supported in a socket 16 carried by a bracket 17 secured to the base 18 of the casing. The socket 16 is enclosed by a removable screw cap 20, as shown in FIGS. 1 and 4. Within the casing 10 a switch S may be provided, connected in the circuit for the bulb 15, to turn the latter on when the hinged cover of the casing 10 is open and off when said cover is closed.

Adjoining the light source 15 is a condensing lens assembly 22 by which light is concentrated and directed through a transparent window 24 mounted on the front wall 25 of the casing 10. The said concentrated light strikes the scale member 13, and brightly illuminates a portion of such member adjacent the transparent window 24.

There is also provided at the window 24 a magnifying lens means comprising a tubular holder 26 having within it a well-known lens system, said holder being externally threaded and adjustable in a mounting block 27 secured in the casing 10.

In alignment with the axis of the magnifying lens means 26 there is provided an apertured plate 29 having an opening 30 adapted to permit light rays from the lens unit 26 to pass through it. The arrangement is such that the brightly lighted portion of the scale member 13 which is disposed immediately outside of the transparent window 24 may reflect light rays back through the window and through the magnifying unit 26 and aperture 30, thereby to effect a projection of an image of said scale portion by such reflected light.

In the path of such light rays I provide a vertically disposed mirror 32 arranged to redirect or reflect the said light rays to the left, as viewed in FIG. 1. In this figure a broken line 34 is shown, representing the reflected light which passes from the illuminated portion of the scale member 13 through the magnifying unit 26 and aperture 30, striking the mirror 32. The reflected rays from the mirror 32 are represented by a broken line 35, FIG. 1. Such reflected rays strike a second vertical mirror 36 which is disposed within the casing 10 adjacent a side wall 37 thereof. The mirror 36 reflects the said rays of light forward, or angularly upward and toward the right as viewed in FIG. 1. A broken line 39 represents these reflected rays, which now strike a third mirror 40 disposed within the casing and also arranged in a vertical plane, the said mirror 40 reflecting the light rays downward as viewed in FIG. 1 or from the front to the rear of the casing 10. Such downward reflected light rays are indicated by the broken line 42.

The mirrors 36 and 40 are movable to compensate for the difference in focal length of the light system by decreasing or increasing the length of the light path. Thus the same magnification is maintained despite the fact that the lens may be positioned nearer to or farther from a work-piece by simply adjusting the mirrors 36 and 40.

Finally, the rays reflected by the mirror 40, which are directed downward as seen in FIG. 1, strike a fourth mirror 44, FIG. 2, which is arranged at a 45 degree angle with respect to the vertical or horizontal. The mirror 44 is the largest of all the mirrors and is disposed below a flat, horizontal screen member 46 which is mounted on the top of a screen frame or housing 47 of generally rectangular configuration. The screen member 46 may be constituted of ground glass, as is well understood in the art, and may be provided with a pair of index lines 49 and 50, FIG. 1, to which the projected image from the scale member 13 may be referred. Such projected image may, for example, be similar to that shown in FIG. 1, constituted by a plurality of equi-spaced graduation lines every fifth one of which is longer and provided with a number.

By the present invention I provide a novel and advantageous shifting mechanism by which the screen 46 may be adjustably moved edgewise, in left and right directions as seen in FIG. 1. Such shifting means includes a generally rectangular channel-section frame 52, FIGS. 1, 2 and 3, extending around and engaging three of the four edges or peripheral portions of the screen 46. One end of the frame 52 is spaced from the corresponding edge of the screen 46, as seen in FIG. 3, and in such space there is disposed a rigid, elongate member or bar 53 which carries a depending pin 54 constituting a cam follower engageable with a rotary cam member shortly to be described.

By such construction the bar 53 is prevented from turning, since the ends thereof are received in and closely fit the flanges of the channel-section frame 52.

The frame 52 is slidable longitudinally in guides provided by upper members 56 of the housing 47, and angle-section members 57 secured to the members 56 in a manner to provide spaces for accommodating the frame 52. This is clearly shown in FIG. 2.

Cooperable with the depending pin or cam follower 54 is a rotary cam 60 carried by a shaft 61 having mounted on one end thereof an adjusting knob 62a. The shaft 61 is carried by a U-shaped bearing bracket 63 having upstanding legs 64 and 65, said bracket being secured to the base 18 of the casing 10. Also carried by the shaft 61 is a rotary scale or scale wheel 67, said wheel being disposed adjacent the cam 60 and having a frictional engagement therewith whereby said wheel and cam normally turn simultaneously as a unit in response to the turning of the knob 62a. However, the scale wheel 67 may be adjustably positioned with respect to the cam 60, thereby to enable differently-numbered graduations to be visible in a window 70 provided in the upper portion of the screen housing 47, directly above the scale wheel 67 (FIG. 1). Such adjustability of the scale wheel 67 with respect to the cam 60 is advantageous where fixed stops are provided for the cam, since it enables adjustment of the scale wheel for zero or maximum reading to be readily effected when the cam is at one or the other limit of its movement.

In accordance with the invention, I further provide spring means comprising springs 68 attached to the frame 52 by which the screen 46 is biased or spring-loaded from left to right as viewed in FIGS. 1 and 3. Also, I provide a spring washer 62 on the shaft 61, by which the cam 60 and shaft 61 are spring-loaded from left to right, thereby to maintain the cam in a fixed axial position at all times. The springs 68 act to hold the cam follower pin 54 firmly in engagement with the driving surface 72 of the cam 60, as seen in FIG. 3.

By this organization there is no unidirectional backlash or lost-motion evidenced during the edgewise shifting of the screen 46 either to the right or to the left, and the slightest turning movement of the knob 62a will at all times cause corresponding, responsive movement of the screen 46. Thus, extreme accuracy is assured in the response of the screen to minute adjustments of the cam 60 and scale wheel 67. In consequence, the said scale wheel may be provided with accurate, closely-spaced graduations and such graduations may be read and relied on as being indicative of minute shifting movements of the screen 46. Such shifting movements, by virtue of the index lines 49 and 50 being referred to the projected image of the illuminated portion of the scale member 13 may be utilized to read or indicate minute shifting movements of the scale 13 with respect to the casing 10 and frame of the machine tool, on which the said casing is mounted. Thus, the carriage which carries the scale member 13 and also carries the workpiece being machined, may be advanced and retracted by minute predetermined amounts, as predetermined by the indicia on the scale wheel 67, and such indications will at all times have extreme accuracy, thereby enabling fine finishing cuts to be made on the work piece.

It will be readily understood by those in the art that the spacing between the index lines 49 and 50 may correspond with the apparent thickness of lines of the projected image which is manifested on the screen 46. The movement of the index lines will also be related to the graduations on the scale wheel 67 whereby decimal or fractional portions of the spaces between adjacent graduations of the projected image may be readily interpolated, and desired decimal values may be preset by shifting the screen 46 and matching marks or lines, thereby to enable the machine operator to accurately feed the work-piece by the desired decimal amount merely by referring to the index marks and image on the screen. Very small subdivisions of the space between graduation lines may thus be readily read and indicated, depending on the manner in which the scale member 13 is made up or subdivided.

By the present invention the amount of lead or the pitch of the rotary cam 60 is made sufficiently great so that slightly less than one complete turn of such cam will shift the screen 46 a distance equal to the space between the projected image lines 49 and 50. By such organization full adjustability of the screen and index lines is had without requiring other than a simple 360 degree scale on the wheel 67.

Further, there is presented a unit design system where all parts are mounted on a mounting plate having no connection with the cover, thereby allowing for full adjustment of the units simply by removing the cover and without disturbing the adjustments when the cover is replaced.

In accordance with the present invention, as illustrated in FIG. 5, I provide an advantageous mounting means for the casing 10 anl optical reading and indicating mechanism contained therein, by which such casing and mechanism may be shifted with respect to its mounting plate between predetermined limits, so as to obviate the necessity for precisely positioning the workpieces on the machine tool carriage. As shown, the casing 10 may include a dovetail slide member 80 carried between a pair of parallel strips or bars 81 and 82 which are secured to a mounting plate or base 83 in turn mounted on the supporting structure affixed to the frame of the machine tool. The base plate 83 also mounts a block 85 having a recess 86 in its underside, into which there extends a lug 87 affixed to the casing 10 and the dovetail slide 80. The lug 87 has a threaded hole in which there is received an elongate screw 89 passing through end portions of the block 85 and at one extremity carrying an adjusting knob 90. With such organization, turning of the knob 90 will cause the screw 89 to shift the lug 87 within the recess 86, causing a shifting of the casing 10 and dovetail slide 80 with respect to the base plate 83. Thus, the casing 10 may be adjustably positioned between limits by the block 85 and lug 87, and this may be initially done after the workpiece has been secured to the carriage of the machine tool. In consequence, there is not required a precise positioning of such workpiece, since adjustment may be made for the position of the same merely by shifting the casing 10 by the knob 90. After this has been once effected, the instrument may be put to use in the manner explained above and well understood in the art.

Further, in accordance with the invention, I provide a novel mounting for the scale member 13 to enable it to retract on the carriage of the machine tool, and provide spring loading for such member whereby in conjunction with a rider carried by the casing 10 the scale member will at all times have a fixed and uniform spacing from the casing and optical system therein as there are made to traverse the member. Referring to FIG. 2, the scale member 13 is carried in an elongate channel-section mounting strip 92, and two elongate, reversely-curved leaf springs 94 are disposed within the strip 92, between the back of the same and the scale member 13. The springs 94 normally yieldably hold the scale member 13 in an advanced position as shown in FIG. 2. It will be understood that while springs 94 have been specifically shown, any other suitable means as for example, a resilient backing of rubber or the like may be used to yieldably hold the scale member in said advanced position. I further provide on the mounting flange 11 of the casing 10 a rider, in the form of a roller 95, which is adapted to engage the face of the scale member 13 and to shift the member to and hold it in a position wherein it is at all times uniformly spaced from the front wall 25 of the casing. With such organization the spacing between the face of the scale member 13 and the casing 10 and optical system contained therein is always maintained uniform, since slight variations in the spacing of the casing from the carrier strip 92 will be compensated for by the leaf springs 94 as the roller 95 depresses the scale member 13 during traversal of such member by the casing.

In the appended claims the wall or base 18 of the casing 10 is considered as the bottom, and directions such as upward, downward, sideways and so forth are understood to be taken with the casing 10 in upright position, resting on the bottom wall or base 18. However, these directions are relative, and are not to be considered in a restrictive sense, since the present instrument will function equally as well when placed on its side, or in other positions, as required by the disposition of the scale member 13.

Variations and modifications may be made within the scope of the claims, and portions of the improvements may be used without others.

I claim:

1. The combination of an elongate scale member; an optical micrometer-type reader and indicator device disposed adjacent the said scale member; means mounting said scale member for lateral forward and rearward movement to enable the member to be positioned either nearer to or further from the said reader and indicator device; spring means yieldably holding the scale member in a forward position close to the said reader and indicator device; and a rider member carried by the said reader and indicator device and engageable with the said scale member to shift and position the same for effecting a uniform spacing between the member and the reader and indicator device when said device is shifted in a direction to traverse the said scale member.

2. The invention as defined in claim 1, in which the means mounting the scale member comprises an elongate holder having a channel-like section, and in which the spring means comprises elongate leaf springs disposed in said holder and engaging the reverse side of the said scale member.

References Cited in the file of this patent

UNITED STATES PATENTS

| | | |
|---|---|---|
| 410,163 | Holland | Sept. 3, 1889 |
| 2,488,237 | Raible | Nov. 15, 1949 |
| 2,497,981 | De Gramont | Feb. 21, 1950 |
| 2,827,699 | Schultze | Mar. 25, 1958 |
| 2,845,802 | Brown et al. | Aug. 5, 1958 |

FOREIGN PATENTS

| | | |
|---|---|---|
| 128,600 | Sweden | June 20, 1950 |